United States Patent [19]

Snyder et al.

[11] Patent Number: 5,784,444
[45] Date of Patent: Jul. 21, 1998

[54] METHOD AND APPARATUS FOR PROVIDING PERSONAL CALLING IDENTIFICATION AT REMOTE LOCATIONS

[75] Inventors: John J. Snyder, Basking Ridge; John Mark Mocenigo, Milford, both of N.J.

[73] Assignee: Lucent Technologies Inc., Murray Hill, N.J.

[21] Appl. No.: 347,737

[22] Filed: Dec. 1, 1994

[51] Int. Cl.[6] .............. H04M 1/56; H04M 15/00
[52] U.S. Cl. .............. 379/142; 379/201; 379/93.23
[58] Field of Search .............. 379/93, 127, 142, 379/201, 210, 211, 212, 199, 93.01, 93.14, 93.17, 93.23; 375/96, 95

[56] References Cited

U.S. PATENT DOCUMENTS

| | | |
|---|---|---|
| 4,899,373 | 2/1990 | Lee et al. . |
| 5,117,452 | 5/1992 | Callele et al. ............ 379/201 X |
| 5,276,731 | 1/1994 | Arbel et al. . |
| 5,278,894 | 1/1994 | Shaw ............................ 379/142 X |
| 5,283,824 | 2/1994 | Shaw . |
| 5,347,574 | 9/1994 | Morganstein ................ 379/142 X |
| 5,502,761 | 3/1996 | Duncan et al. .................. 379/142 |
| 5,509,062 | 4/1996 | Carlsen ........................ 379/142 X |

*Primary Examiner*—Curtis Kuntz
*Assistant Examiner*—Paul Loomis

[57] ABSTRACT

This invention relates to a method and apparatus for specifying alternative phone numbers to be used as Incoming Calling Line Identification (ICLID) numbers. When calling from a remote telephone station, the caller may provide personalized information including a telephone number and corresponding indicia, and indicate the telephone number is to be used as the ICLID number. Further, the caller may provide a personal message along with the telephone number and its accompanying indicia. Advantageously, callers may identify themselves, or for the purposes of ICLID, with their home or business telephone number even when they are calling from a different telephone station.

25 Claims, 6 Drawing Sheets

METHOD AND APPARATUS FOR PROVIDING PERSONAL CALLING IDENTIFICATION AT REMOTE LOCATIONS

BACKGROUND OF THE INVENTION

1. Field of the Invention

This invention generally relates to caller identification for telephone communication calls, and more particularly to an apparatus and method for providing personal calling identification at remote phone locations.

2. Description of Related Art

Incoming calling line identification (ICLID) is becoming an increasingly popular service. With ICLID the called customer receives the identification of the caller. This identification can be used by the called customer to make a decision as to whether or not to answer the call or to properly prepare mentally to answer the call. In addition, ICLID, in conjunction with such services as local area signaling services (LASS), can be used for selectively completing the call for people or computer systems that wish to accept calls only from certain callers, rejecting calls for people who wish to reject calls from certain callers, to provide special alerting signals in case the call is from one of a select group of callers, or to forward calls from selected callers.

A setback arises when the caller is not at his/her home or business telephone. For example, if the caller is at an airport and is making a calling card call, the ICLID number that is received and used at the switching system serving the called customer is the number of the paid telephone station at the airport and is not the number that is listed for the called customer's LASS services or the number that would be recognized by the called customer. Accordingly, a problem of the prior art is that ICLID service, by identifying the telephone station from which a call originates, does not present to the called customer and the switching system serving that called customer, the information needed to properly serve a call when a caller is calling from a telephone station other than his/her home or business telephone station.

Commonly assigned U.S. Pat. No. 5,283,824 to Shaw provides a solution to the aforementioned setback associated with ICLID by providing a telecommunication switching system which enables a protocol between the calling phone and the PBX switch. The aforementioned telephone switching system is operative, such that when the calling phone signals the PBX switch to set up a calling card call, the switch sends a tone to the phone requesting the calling card number. The caller then dials or enters the calling card number, or another telephone number, such as his/her home or office, with a personal identification number. The switch then asks the caller whether the calling card number or the calling telephone number should be used as the ICLID. Therefore, the caller is properly identified by his/her home or business telephone number when the caller is placing a phone call at a phone other than his/her home or business telephone.

The present invention as described hereinbelow is directed to an improvement over this system which enables a caller to be properly identified when calling from a phone station other than his/her home or business telephone, additionally, the present invention enables a caller to personalize his/her phone call with a brief message.

SUMMARY OF THE INVENTION

The present invention relates to a telecommunication system which is adapted to enable a caller to supplement the incoming calling line identification number with a personalized incoming calling line identification number. The personalized incoming calling line identification number is preferably the telephone number of the caller's home or office and is to be supplemented with the common incoming calling line identification number when the caller is placing a phone call from a remote telephone station (i.e., an airport telephone).

In the preferred embodiment, each telephone station associated with the telecommunication system of the present invention is provided with display means adapted to display the conventional incoming call line identification number as well as the personalized incoming calling line identification number. Each telephone station further includes a telephone transceiver and processor means. The processor means is operative under the control of a program to store both the conventional incoming calling line identification number and the personalized incoming calling line identification number provided by the caller. The processor is further operative under the control of the program to transmit the aforementioned incoming calling line identification numbers to a telephone switching network so as to enable transmission of the aforementioned incoming calling line identification numbers to at least one other telephone station associated with the telephone communication system of the present invention.

A method of providing personalized communication services utilizing the telecommunication system of the present invention includes the following steps. First, a caller inputs a first telephone number in an originating telephone station, wherein the first telephone number corresponds to the telephone number of another telephone station associated with the telecommunication system. The caller then inputs a second telephone number in the originating telephone station wherein the second telephone number is a telephone number other than the third telephone number associated with the originating telephone station. The first, second and third telephone numbers are then simultaneously transmitted to the switching network which, in turn, enables the simultaneous transmission of the second and third telephone numbers to the telephone station having the first telephone number. A determination is then made at the telephone station having the first telephone number as to whether to answer a phone call from the originating telephone station on the basis of the second and third telephone numbers which are displayed on a display means associated with each telephone station associated with the telecommunication system of the present invention.

BRIEF DESCRIPTION OF THE DRAWINGS

The foregoing features of the present invention will become more readily apparent and may be understood by referring to the following detailed description of an illustrative embodiment of an apparatus according to the present invention, taken in conjunction with the accompanying drawings, in which.

DETAILED DESCRIPTION OF THE PREFERRED EMBODIMENTS

Figure 1:
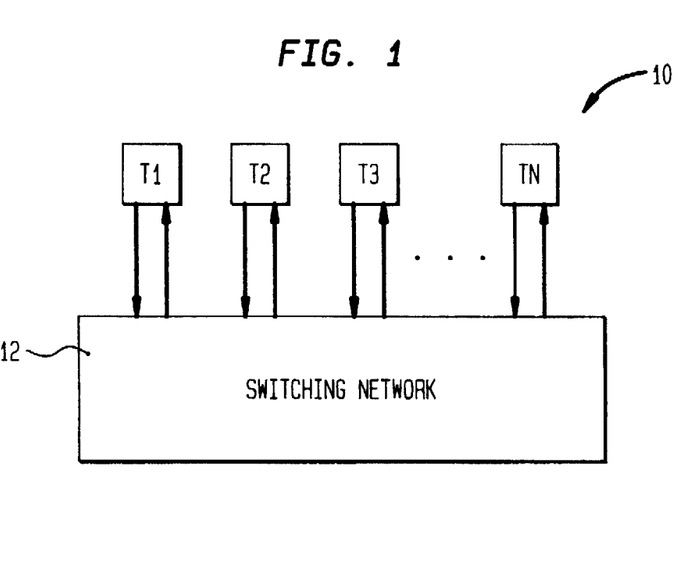
FIG. 1 is a block diagram which illustrates the manner in which an embodiment of the present invention is configured for use in a telephone environment.

Referring now to the drawings, in which like reference numerals identify similar or identical elements, FIG. 1 illustrates a telephone system designated generally by reference numeral 10 which is depicted as an intended environment for implementation of the present invention. Telephone system 10 preferably includes a plurality of telephone stations $T_I$ through $T_N$, each respectively connected to a public telephone switching network 12. As is conventional, a telephone call transmitted from telephone $T_I$ to $T_N$ is first transmitted over a public telephone line to the switching network 12 which is operative to switch and direct the telephone signal to the public telephone line which is coupled to telephone station $T_N$ so as to enable communication between telephone station $T_I$ and telephone station $T_N$. It is to be appreciated that both the configuration and functionality of the public telephone switching network 12 is well known in the art and, therefore, does not require further detailed description herein.

Figure 2:
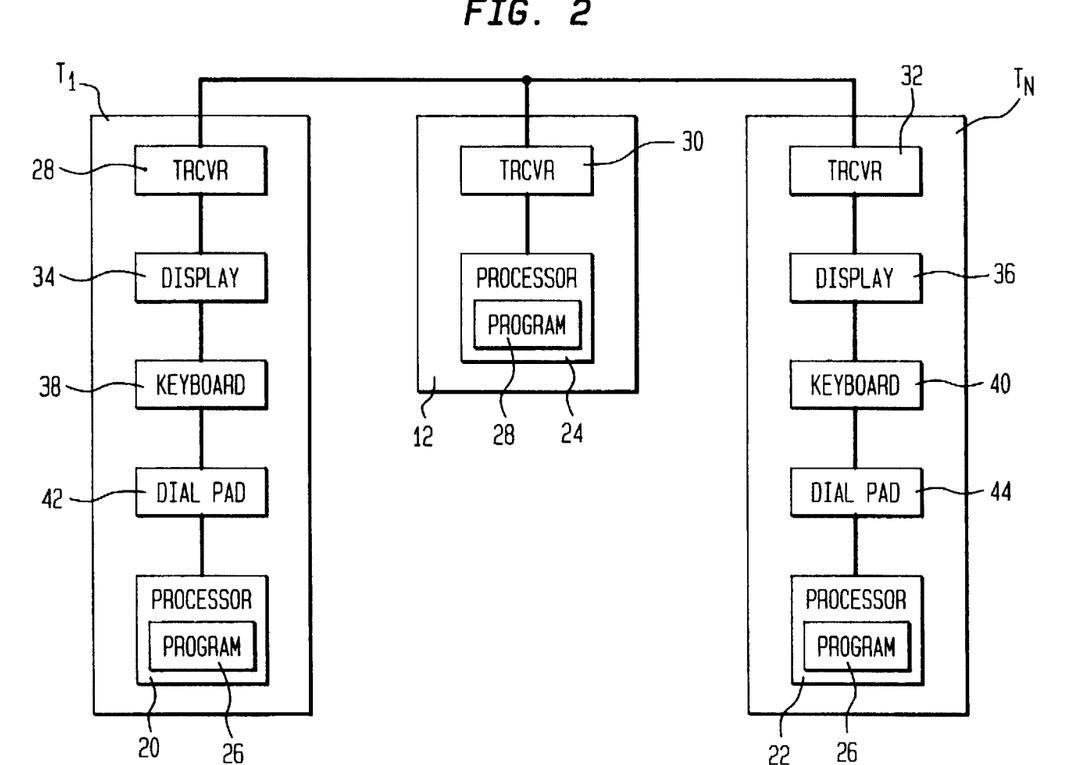
FIG. 2 is a simplified block diagram of a telephone system of FIG. 1, illustrating first and second telephone stations coupled to a telephone switching network embodying the present invention.

Referring to FIG. 2 in conjunction with FIG. 1, there is illustrated a simplified block diagram of telephone system illustrating telephone stations $T_I$ and $T_N$, and switching network 12 which are respectfully adapted for implementation of the present invention. In particular, each telephone station $T_I$ and $T_N$, respectively includes a processor 20, 22 which are each controlled by a program 26 for executing the program as specified by the flow charts illustrated and described hereinbelow. Similarly, switching network 12 includes a processor 24 which is controlled by a program 28 for executing the aforementioned program as specified by the above mentioned flow charts. Further, each telephone station $T_I$ and $T_N$, and switching network 12 each respectfully include a telephone transceiver 28, 30, 32 for enabling telephone communication between the aforementioned components.

Each telephone station $T_I$ through $T_N$ in the telephone system 10 of the present invention is further provided with a display screen 34 and 36 adapted for providing numeric as well as textual information. Preferably, each display screen 34 and 36 is configured to have a display of at least 4 lines by 40 characters. A keyboard 38, 40 is also preferably provided in each telephone station $T_I$ through $T_N$ which preferably provides full ASCII input capability and further provides cursor and editorial control keys for use in conjunction with each respective display screen 34, 36. Each telephone station $T_I$ through $T_N$ further includes a telephone dial pad 42, 44 adapted for use in conjunction with the switching network 12, as is well known. Further, it is noted that the key board 38, 40 and dial pad 24, 44 may be integrated or share common keys on any given telephone station $T_I$ through $T_N$. The functionality of the aforementioned components will be appreciated with reference to the flow charts depicting the program 26 described hereinbelow.

Figure 3:
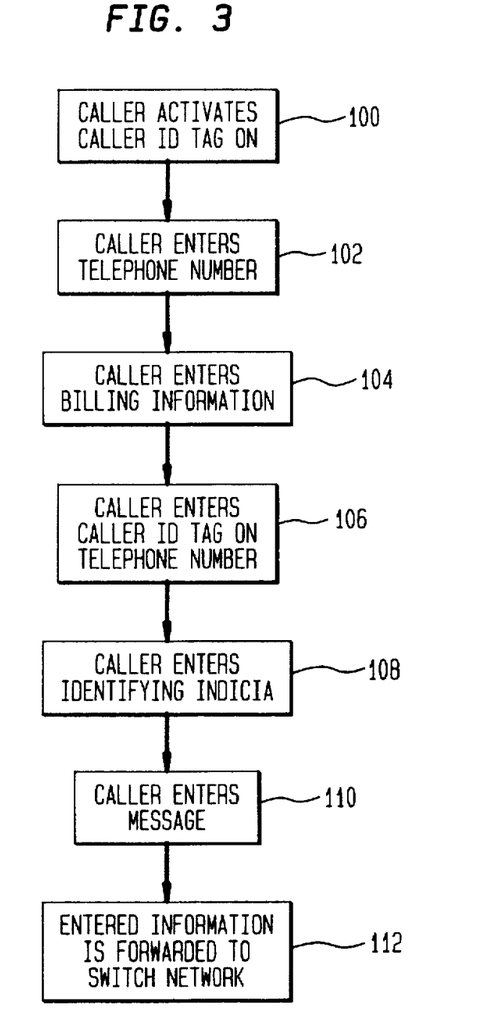
FIGS. 3, 4 and 5 are flow diagram representations of functions carried out in the telephone system of FIG. 2 in accordance with the present invention.
Figure 4:
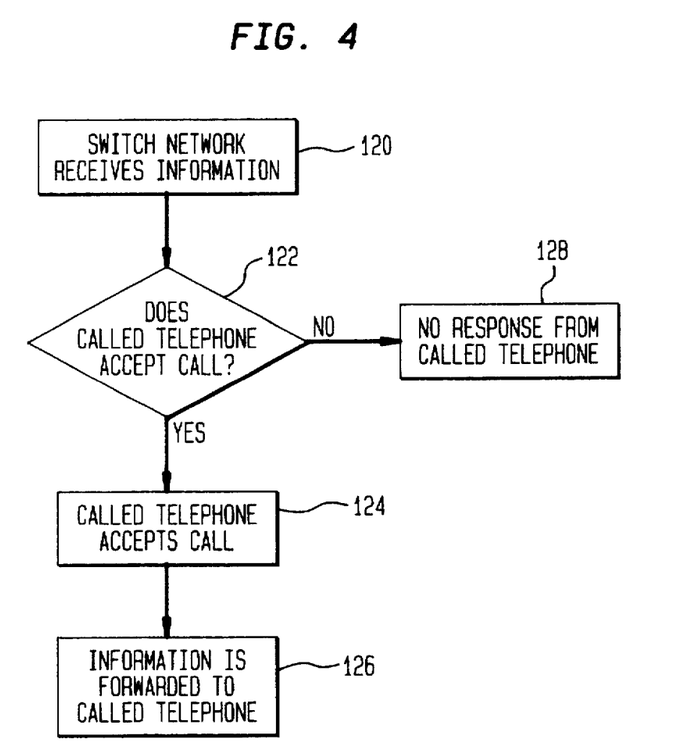
Figure 5:
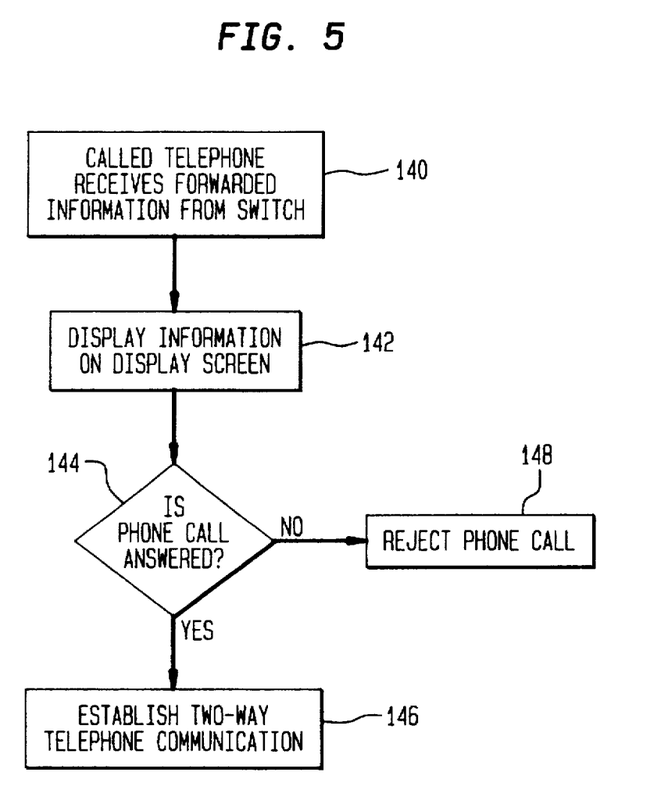

Reference shall now be made to FIGS. 3 to 5, in conjunction with FIGS. 1 and 2, which respectfully illustrate flow charts depicting the program 26 executed by the aforementioned processors 20, 22 and 24 of the present invention. For simplicity, discussion hereinbelow of the present invention will be made in reference to FIG. 2, wherein a caller of telephone station $T_I$ is calling a called party of telephone station $T_N$. Further, the caller of telephone station $T_I$ is initiating a phone call at a remote location (i.e., an airport) other than the usual location of the caller's telephone station (i.e., home or office). It is to be appreciated that the aforementioned scenario is for illustrative purposes only and is not to be limited thereto, as it is to be understood that the present invention is intended to be utilized whenever a caller desires to personalize his/her phone call.

FIG. 3 is a flow chart of a method of carrying out the present invention whereby a caller personalizes a telephone call when calling from a remote telephone (T1). Preferably, when the caller first operates telephone station T1, the caller activates the incoming calling line identification tag on (ICLIDTO) feature of the present invention (block 100) through appropriate interaction of the display screen 34 with preferably the keyboard 38. Reference shall now also be made in conjunction with the display screen illustrated in FIG. 6 which depicts the screen display of the ICLIDTO feature of the present invention, designated generally by reference numeral 200.

Figure 6:
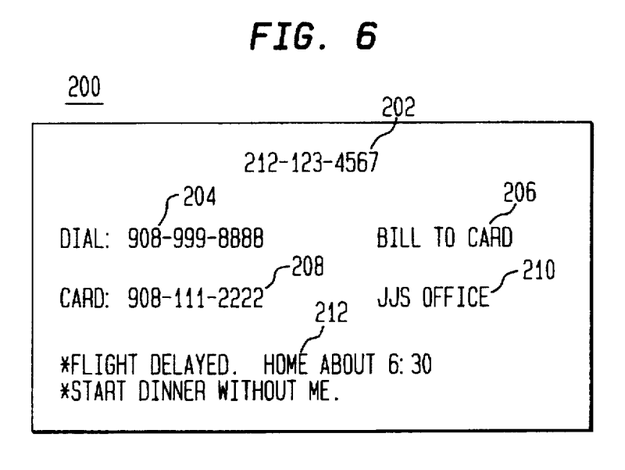
FIGS. 6 and 6a are illustrations of screen displays of the telephone stations of FIG. 2 in accordance with the present invention.

As shown in FIG. 6, the video screen 200 of display 34 indicates the corresponding telephone number 202 (i.e., 212-123-4567) of telephone station T1. The caller then enters, via dial pad 42, the telephone number 204 (i.e. 908-999-8888) the caller desires to call (i.e., telephone station $T_N$) (block 102). The caller then enters the billing format (block 104) of the phone call, whereupon it is preferably indicated 206, on video screen 200 (i.e., Bill to Card). As is well known, the billing format can encompass any known method of billing for the phone call, such as billing to a phone card, billing to a credit or debit card, collect calling or simply inserting appropriate currency into a public telephone.

The user then enters his/her ICLIDTO number 208 (i.e., 908-111-2222), via dial pad 42, (block 106) which is to be used as the tag-on caller ID phone number (i.e., 908-111-2222) to be received and processed by telephone $T_N$ (FIG. 2) in addition to the corresponding telephone number (i.e., 212-123-4567) of telephone station T1. Preferably, the ICLIDTO number may also be accompanied by a limited amount of indicia 210 (i.e., jjs office) which further identifies the caller to the called party which is entered by the user (block 108), via keyboard 38. Additionally, the caller may enter a short message 212, via keyboard 38 (preferably 2 text lines) (block 110) to which is to be transmitted to telephone station $T_N$, as will be further described hereinbelow.

As is well known in the art, the caller may enter a calling card number, perhaps through the use of a calling card reader, via dial pad 42 of telephone station T1. Such a calling card may automatically enter the billing format 104, the ICLIDTO number 208 (block 106) and indicia 210 (block 108) which are all to instantaneously appear on the video screen 200 of display 200, as described. Of course, the user may edit any of the aforementioned calling card information through manipulation of preferably the aforementioned cursor and editorial keys associated with the keyboard 38.

After the user has visually identified that all the aforementioned information appearing on screen 200 of display 34 is correct, the user then simultaneously transmits this information (block 112) to switching network 12, via transceiver 28, so as to connect telephone station $T_I$ with telephone station $T_N$, via transceivers 30 and 32, as is well known in the art. Prior to transmitting the aforementioned information (block 112), as described above, the user may change the inputted information appearing on screen 200 by using the appropriate cursor and edit keys associated with the keyboard 38, as mentioned above.

Referring now to FIG. 4, in conjunction with FIGS. 1 and 2, when the switching network 12 first receives the aforementioned ICLIDTO information (block 120), via transceiver 30 of telephone station T1, the switching network 112 then "Dials" the telephone number (i.e., 908-999-8888) which corresponds with telephone station $T_N$. A determination is then made as to whether telephone station $T_N$ accepts the phone call or does not accept (block 122). If yes (block 124), the switching network simultaneously forwards the aforementioned ICLIDTO information from switch 12, via transceiver 30, to telephone station $T_N$, via transceiver 32 (block 126). If telephone station $T_N$ does not respond to the call, the switching network then notifies the caller of the telephone station $T_N$'s failure to respond (block 128) (i.e., a busy signal or no answer).

Figure 6A:
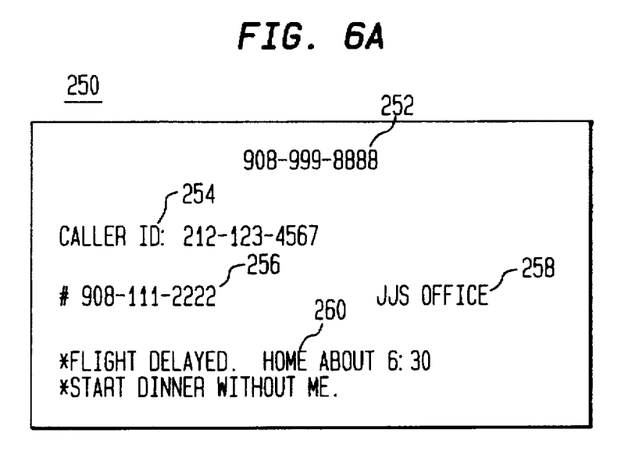

Referring now to FIG. 5 in conjunction with FIG. 6a, when telephone $T_N$ station accepts the phone call from telephone station T1, (block 140), the aforementioned ICLIDTO information is then displayed as screen 250 on display 36 of telephone $T_N$, as shown in FIG. 6a (block 142). The called party may then view the ICLIDTO information presented on screen 250 of telephone station $T_N$ so as to make a determination as to whether to answer or reject the phone call from telephone station $T_I$ (block 144). As shown in FIG. 6a, the screen 250 of display 36 preferably includes its corresponding phone number 252 (i.e., 908-999-8888), the caller ID of telephone station $T_I$ 254 (i.e., 212-123-4567), the caller ID tag on number 256 (i.e., 908-111-2222) and its corresponding indicia 258 (i.e., jjs office). Further, screen 250 is adapted to display the aforementioned short message 260 inputted by the user of telephone T1, as described above.

If the phone call is answered by the called party of telephone station $T_N$, then two-way telephone communication is established between telephone stations $T_I$ and $T_N$, via switching network 12 (block 146). If the phone call is not to be answered by the called party (block 148), the aforementioned ICLIDTO information may then be electronically stored in telephone station $T_N$, whereby the user of telephone $T_N$ may retrieve and delete it at a later time, whereby the phone call from telephone station $T_I$ is then rejected.

Further, in a telephone service such as local area signaling services (LASS), the aforementioned ICLIDTO information may be used for selectively completing the call for people or computer systems that are preprogrammed to accept calls only from certain callers, reject calls from certain callers, to provide special alerting signals in case the call is from one of a select group of callers, or to forward calls from selected callers.

The aforementioned selectivity of LASS is enhanced with the telephone system of the present invention, in that a called telephone station is not only limited to using the caller ID number (i.e., 212-123-4567) as an identifying flag (as in the prior art) but may also utilize the caller ID tag on number (i.e., 908-111-2222) and corresponding indicia (i.e., jjs office) as an identifying flag. Thus, a caller at a remote phone, other than the callers usual phone (i.e., home, office), may utilize customized identifying flags (the caller ID tag or number) when calling from a remote phone so as to ensure that the phone call will be answered and not automatically rejected.

In another preferred embodiment of the present invention, a receiving telephone may accept a call from another telephone based upon the telephone number (block 204, FIG. 6) of the transmitting telephone or the called ID tag-on number (i.e., 908-999-8888). Moreover, the receiving telephone may accept a call from another telephone based upon the aforementioned received indicia 258 and/or short message 260. Further, under the instructions of the aforementioned program 26, the receiving telephone may be configured, after zero (0) or more ring signals to accept the incoming call so as to obtain the aforementioned short message 260. If the called party does not respond to the call within a specified internal as prescribed by the aforementioned program 26, the call is to then be disconnected.

While the invention has been particularly shown and described with reference to certain preferred embodiments, it will be understood by those skilled in the art that various modifications in form and detail may be made therein without departing from the scope and spirit of the invention. Accordingly, modification to the preferred embodiments will be readily apparent to those skilled in the art, and the generic principles defined herein may be applied to other embodiments or applications without departing from the scope and spirit of the invention.

What is claimed is:

1. A telecommunications system comprising: (a) at least two telephone stations interconnected by a telephone switching network; each telephone station including:
   (i) a telephone transceiver; and
   (ii) processor means coupled to said telephone transceiver and operative under the control of a program for storing, for a single telephone call, a first incoming calling line identification (ICLID) number which corresponds to the telephone number of said telephone station and a second ICLID number provided by a user, said processor means further operative under the control of said program to transmit during the single telephone call, both said first and second ICLID numbers to a telephone switching network for transmission of said first and second ICLID numbers to at least one other telephone station.

2. A telecommunications system as recited in claim 1, wherein said processor means of each said telephone station is further operative under the control of said program to store a first message to be associated with said second incoming calling line identification number and to transmit said first message to said switching network simultaneous with said first and second incoming calling line identification numbers.

3. A telecommunications system as recited in claim 2, wherein said processor means of each said telephone station is yet further operative under the control of said program to store a second message, and to transmit said second message to said switching network simultaneous with said first message and said first and second incoming calling line identification numbers.

4. A telecommunications system as recited in claim 3, wherein each said telephone station includes display means coupled to said processor means for displaying said first and second incoming calling line identification numbers and said first and second messages.

5. A telecommunications system as recited in claim 4, wherein each said telephone station includes input means coupled to said processor means for enabling input of said second incoming calling line identification number and said first and second messages to said processor means by a user.

6. A telecommunications system as recited in claim 5, wherein said input means includes a telephone dial pad.

7. A telecommunications system as recited in claim 6, wherein said input means further includes a keyboard having full ASCII input capability.

8. A method of providing personalized communication services in a telecommunication system comprising a plurality of telephone stations and a switching network for interconnecting said plurality of telephone stations, said method comprising the steps of:

(a) receiving, at said switching network, signals corresponding to a first telephone number supplied by a user at an originating telephone station, said first telephone number corresponding to a telephone number of a called party telephone station the user desires to call;

(b) receiving, at said switching network for a single telephone call, signals corresponding to a second number supplied by the user at said originating telephone station, and further obtaining, by said switching network, a third telephone number associated with said originating telephone station; and (c) transmitting, for a single telephone call both said second and third numbers from said switching network towards said called party telephone station corresponding to said first telephone number.

9. A method of providing personalized communication services as recited in claim 8, further including the steps of:

(d) inputting a first message in said originating telephone station; and (e) simultaneously transmitting said second and third numbers and said first message to said telephone station corresponding to said first telephone number.

10. A method of providing personalized communication services as recited in claim 9, further including the steps of;

(f) inputting a second message in said originating telephone station; and (g) simultaneously transmitting said second and third numbers and said first and second messages to said telephone station corresponding to said telephone station corresponding to said first telephone number.

11. A method of providing personalized communication services as recited in claim 10, further including the step of;

(h) inputting billing information in said originating telephone station which corresponds to the billing format of a phone call placed from said originating telephone station.

12. A method of providing personalized communication services as recited in claim 11, further including the step of;

(i) inputting a calling card number in said originating telephone station, wherein said inputted calling card number is operative to automatically input said second number in said originating telephone station.

13. A method of providing personalized communication services in a telecommunication system comprising a plurality of telephone stations each associated with respective display means, and a switching network for coupling communication between ones of said plurality of telephone stations, said method comprising the steps of:

receiving, at said switching network, a first telephone number supplied by a user at an originating telephone station, said first telephone number corresponding to a telephone number of another telephone station the user desires to call;

receiving, at said switching network, a visually displayable message provided by the user at said originating telephone station; and transmitting, for a single telephone call, said displayable message and at least one number indicated by the user of the originating telephone station as incoming calling line identification (ICLID) signals towards said telephone station corresponding to said first telephone number.

14. The method according to claim 13, wherein said at least one number comprises a first telephone number associated with said originating telephone station and a second number associated with the user.

15. The method according to claim 13, wherein said at least one number includes a number associated with the user of said originating telephone station that is different from a telephone number of said originating station.

16. The method according to claim 13, wherein said visually displayable message comprises a text message.

17. A telephone operable in a telecommunications system, said telephone comprising:

a telephone transceiver; and processor means coupled to said telephone transceiver and operative under the control of a program for storing a first number which corresponds to the telephone number of said telephone in the telecommunications system and a second number provided by a user of said telephone, said processor means further operative under the control of said program to transmit, for a single telephone call, said first and second numbers to a telephone switching network to enable transmission of incoming calling line identification (ICLID) signals corresponding to said first and second numbers to at least one other telephone station.

18. The telephone according to claim 17, wherein said processor is further operative to store a visually displayable message supplied by a user of said telephone and to transmit said message substantially simultaneous with said first and second numbers to the telephone switching network to be displayed on said at least one other telephone station.

19. The telephone according to claim 18, wherein said visually displayable message comprises a text message.

20. A telephone operable in a telecommunication system, said telephone comprising:

means for receiving incoming calling line identification (ICLID) signals and extracting therefrom, for a single telephone call, both a first telephone number corresponding to a calling party telephone and a second number provided by a user of the calling party telephone and corresponding to a number associated with the user; and display means for displaying said first and second telephone numbers.

21. The telephone according to claim 20, wherein said telephone further includes means for receiving signals corresponding to a visually displayable message supplied by the user at the calling party telephone, and for causing said message to be displayed along with said first and second numbers on said display means.

22. A telephone operable in a telecommunications system, said telephone comprising:

means for receiving both incoming calling line identification (ICLID) signals and incoming signals corresponding to a visually displayable message supplied by a user of a calling party telephone, and for extracting from said ICLID signals at least one number indicated by the user of the calling party telephone; and display means for displaying said at least one number along with said visually displayable message.

23. The method according to claim 8, wherein said obtaining a third number by said switching network is accomplished by said switching network receiving said third number from said originating telephone station.

24. The method according to claim 8, wherein said obtaining a third number by said switching network is accomplished by said switching network determining said third number from knowledge of a line connected to said originating telephone station.

25. The method according to claim 8, wherein said second and third numbers are transmitted from said switching network towards said called party telephone station as incoming calling line identification (ICLID) signals.

* * * * *